Figure 1:
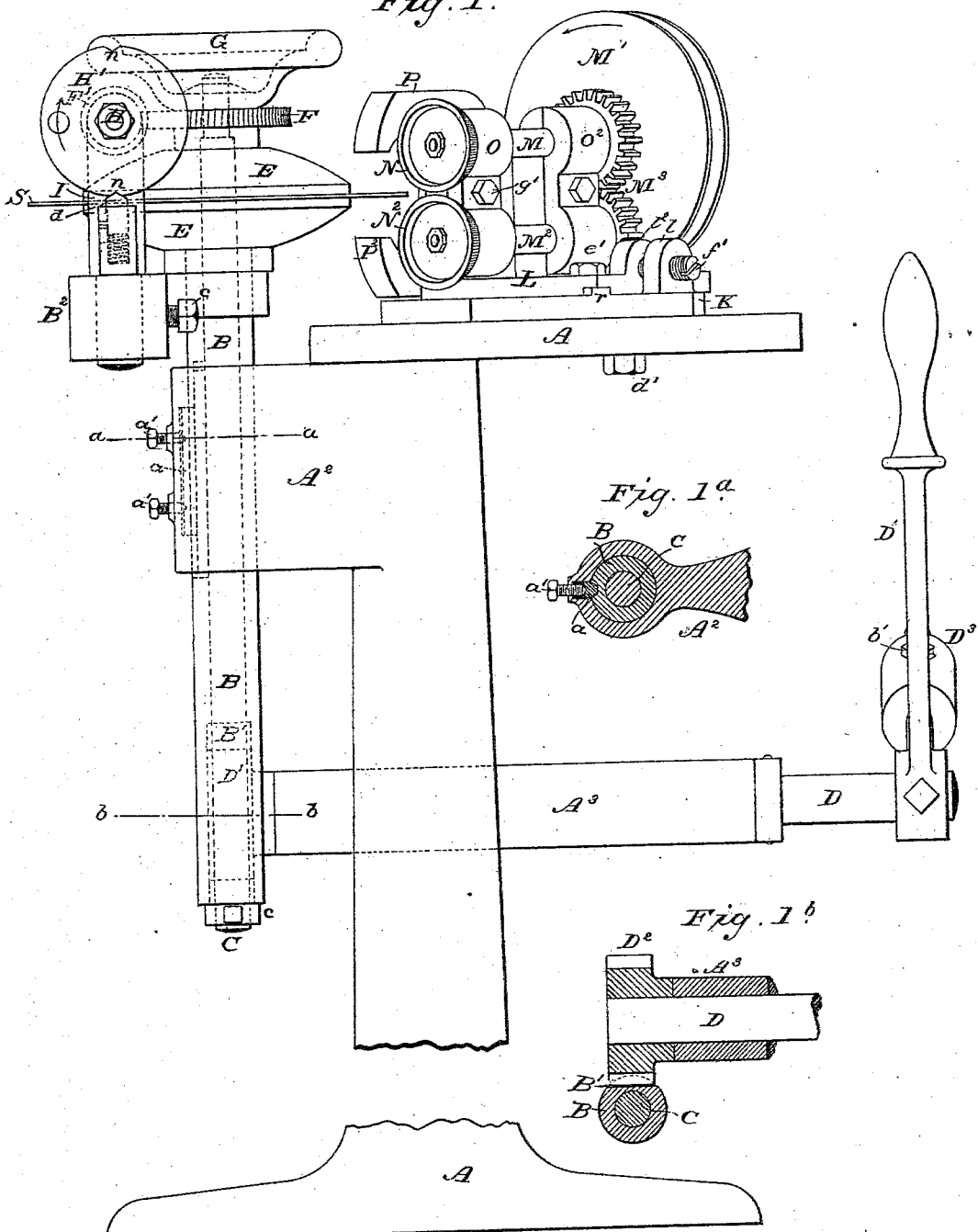

(No Model.)  5 Sheets—Sheet 2.
W. TUCKER.
SAW FILING MACHINE.
No. 295,133. Patented Mar. 11, 1884.
Fig. 2.
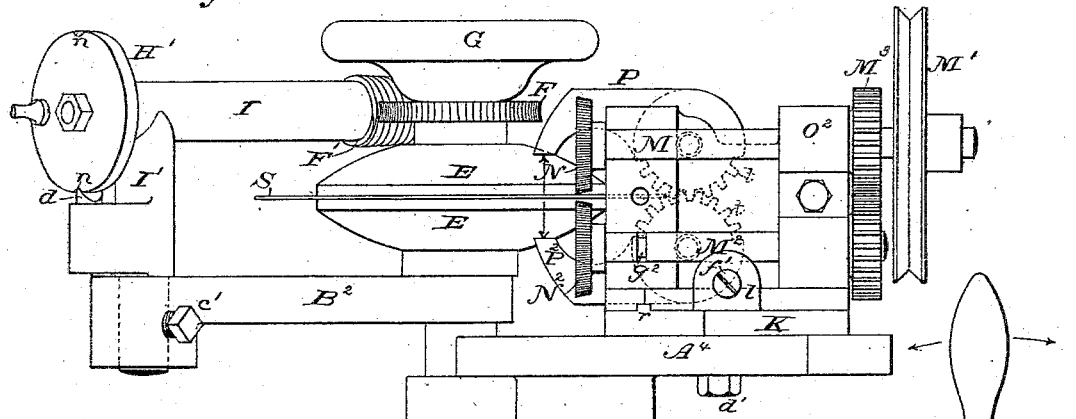
Fig. 2.ª
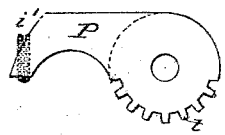
Fig. 2.ᵇ
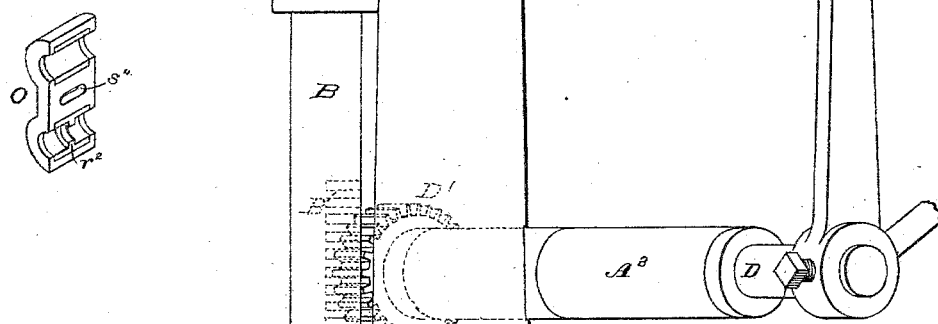
WITNESSES
Wm A. Skinkle
Henry A. Lamb
INVENTOR
William Tucker
By his Attorney
Jas. L. Ewin.

(No Model.)  5 Sheets—Sheet 3.
W. TUCKER.
SAW FILING MACHINE.
No. 295,133. Patented Mar. 11, 1884.
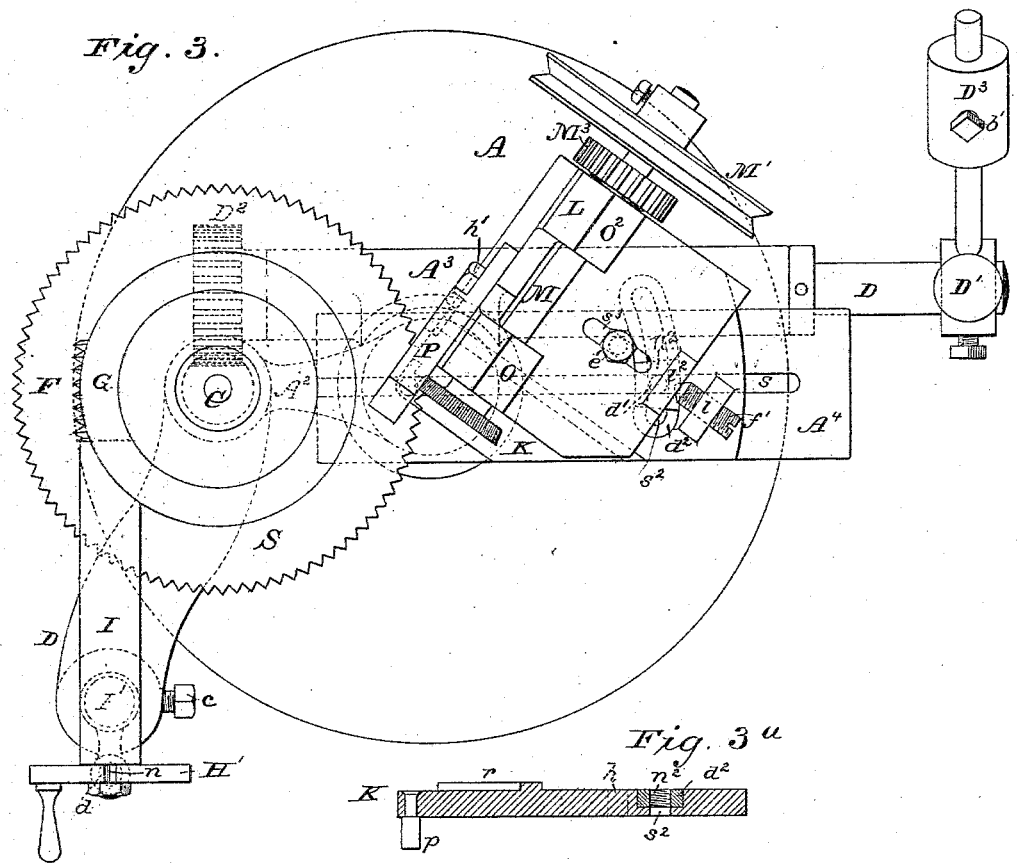
Fig. 3.
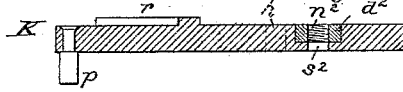
Fig. 3ᵃ
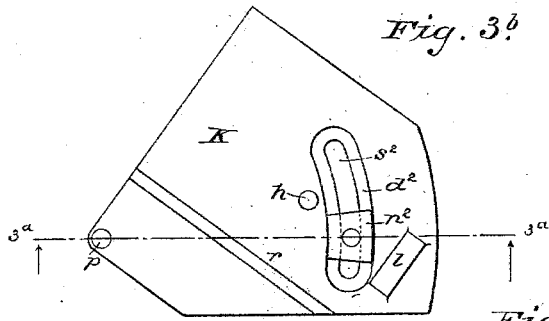
Fig. 3ᵇ
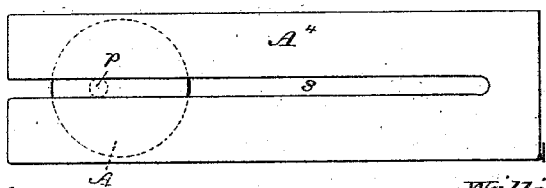
Fig. 3ᶜ
WITNESSES
Wm A. Skinkle
Henry A. Lamb
INVENTOR
William Tucker
By his Attorney
Jas. L. Ewin.

(No Model.) 5 Sheets—Sheet 4.
W. TUCKER.
SAW FILING MACHINE.
No. 295,133. Patented Mar. 11, 1884.
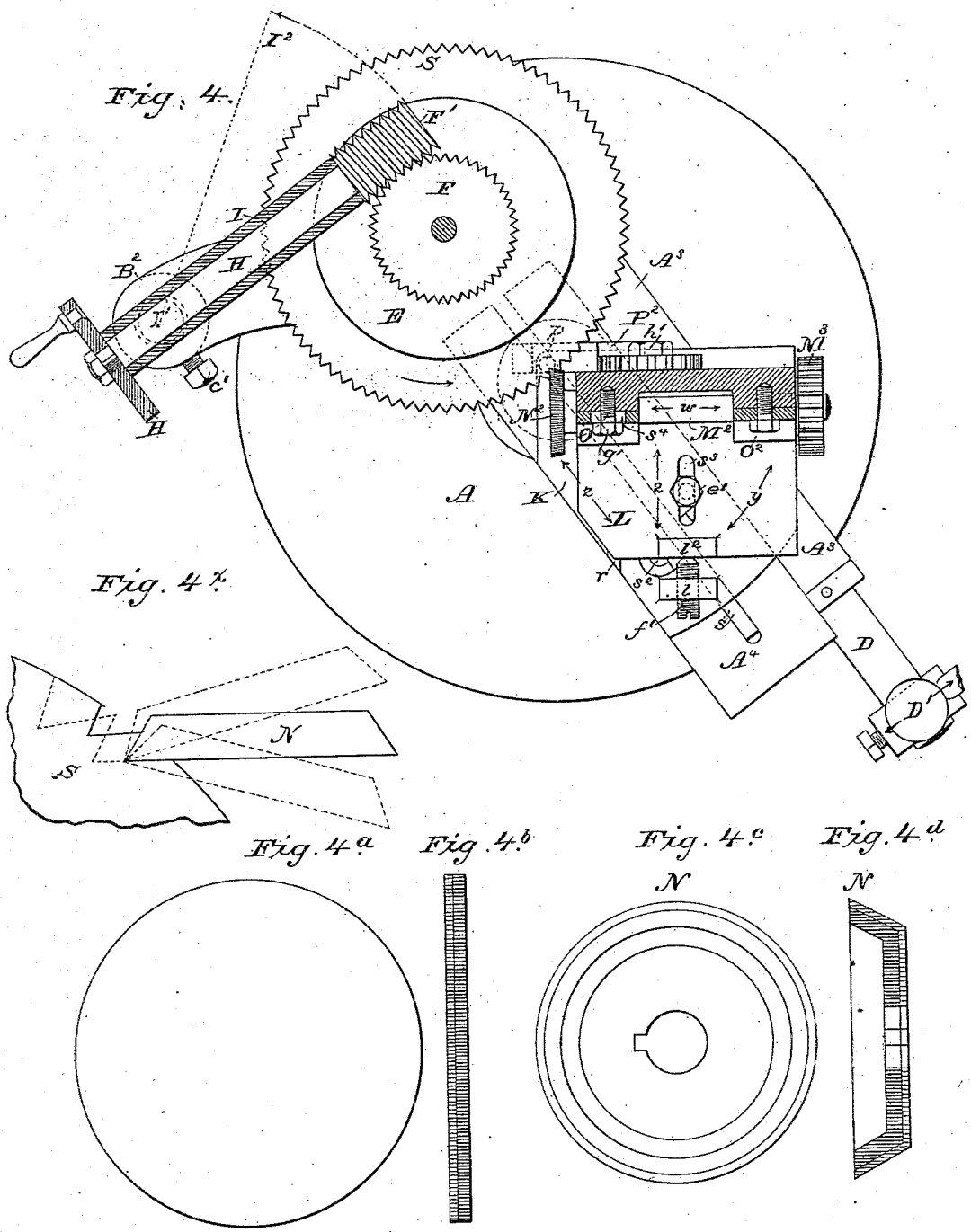
WITNESSES
Wm A. Skinkle
Henry A. Lamb
INVENTOR
William Tucker
By his Attorney (No Model.)
5 Sheets—Sheet 5.
W. TUCKER.
SAW FILING MACHINE.
No. 295,133. Patented Mar. 11, 1884.
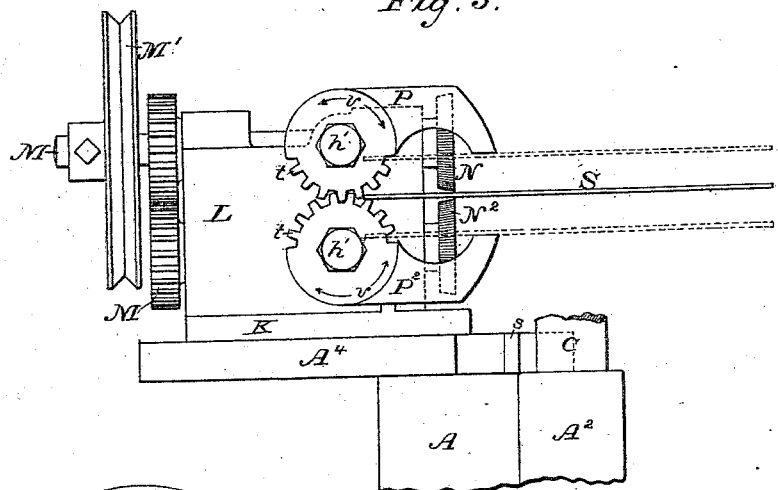
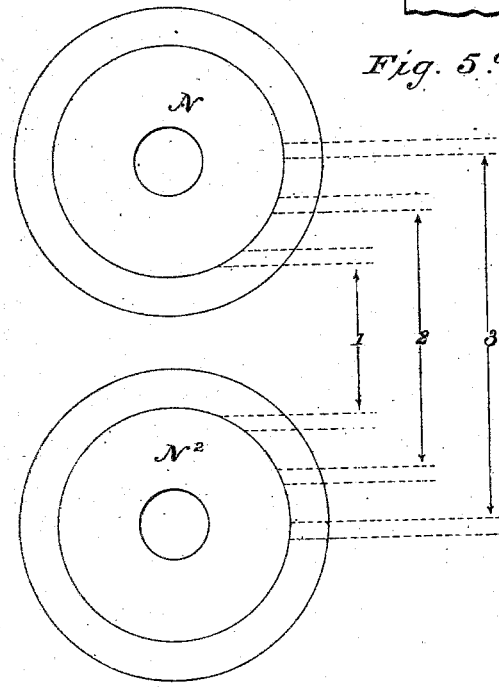
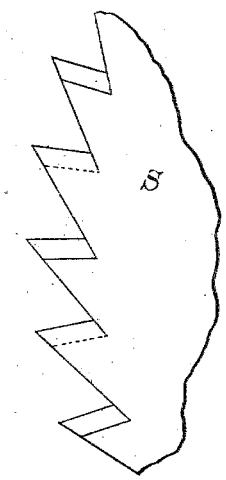
WITNESSES
Wm A. Skinkle
Henry A. Lamb
INVENTOR
William Tucker
By his Attorney

UNITED STATES PATENT OFFICE.

WILLIAM TUCKER, OF EAST BROOKFIELD, MASSACHUSETTS.

SAW-FILING MACHINE.

SPECIFICATION forming part of Letters Patent No. 295,133, dated March 11, 1884.

Application filed June 20, 1883. (No model.)

*To all whom it may concern:*

Be it known that I, WILLIAM TUCKER, a citizen of the United States, residing at East Brookfield, in the State of Massachusetts, have invented a new and useful Improvement in Saw-Filing Machines, of which the following is a specification.

This invention relates, primarily, to machines for filing circular saws and to that class of saw-filing machines in which rotary files are used.

The principal object of this invention is to provide for filing or sharpening saws in such a way as to obtain the advantages derivable from having the teeth as perfectly in truth and alike as it is possible to make them by machinery. To facilitate accomplishing this result it was deemed advisable to confine the bevel or "fleam," which is common to the teeth of all "cutting off" saws, to the front of each tooth. I have discovered that by producing a suitable bevel or fleam on the front of the tooth, and filing the back square across, the saw is improved in its cutting rather than impaired, while the form of tooth-point thus produced is adapted to preserve its shape much better than the double-beveled points of the teeth of cutting-off saws as heretofore shaped. The object of filing saw-teeth beveled or fleaming, as is well known, is to form points for cutting across the fibers of the wood by a shearing-cut, and the front of each tooth alone is effective in this operation. The harsh sound commonly made in filing saw-teeth obliquely, as in filing them fleaming, is caused by the teeth of the file stubbing against the salient angles on the one side. On the opposite side, the angle being obtuse, does not catch the file-teeth, and the file makes a "wiping" cut. Said harsh sound, or "chattering," as it is termed, is not only disagreeable to hear, but the inharmony of the sound denotes a want of adaptation in the process, and the file is in fact rapidly destroyed in its production, while the surface of the work is not as smooth where this stubbing takes place as where the file has a wiping-cut. By means of my present machine I am enabled to file saw-teeth fleaming with a wiping-cut at all times, and to space the teeth as truly as in gear-cutting, while the depth and shape of the teeth may be varied by easily-made adjustments of the machine, so as to suit different classes of work and the taste of different users of saws.

My present invention consists in certain novel combinations of parts and features of construction, hereinafter described and claimed, whereby I am enabled to accomplish the results above stated and other beneficial results, hereinafter set forth.

Five sheets of drawings accompany this specification as part thereof. On Sheet 1, Figure 1 is a front view of the machine; and Figs. $1^a$ and $1^b$ are cross-sections on the lines $a\,a\,b\,b$, Fig. 1. On Sheet 2, Fig. 2 is another side view of the machine from a different standpoint, with a part removed. Fig. $2^a$ is a perspective view of this part, and Fig. $2^b$ is an elevation of another part, illustrating a modification. On Sheet 3, Fig. 3 is a top view of the machine, as seen in Fig. 1. Figs. $3^a$ and $3^b$ are respectively a vertical section and a top view of a part detached, and Fig. $3^c$ is a plan view of the top of the pedestal of the machine. On Sheet 4, Fig. 4 is a sectional top view of the machine, as seen in Fig. 2. Figs. $4^a$, $4^b$, $4^c$, and $4^d$ are detail views of one of the files on a larger scale, illustrating the process of its manufacture; and Fig. $4^x$ is a diagram illustrating the adjustment of the files or the effects of their several adjustments. On Sheet 5, Fig. 5 is a back view of the head of the machine, illustrating another feature of its operation. Fig. $5^a$ is a diagram, including a back view of the files on a larger scale, illustrating said feature more fully; and Fig. $5^b$ is a face view of a fragment of a circular saw, showing the form of teeth produced by confining the bevel or fleam to the front of each tooth.

Like letters of reference indicate corresponding parts in all the figures.

The moving parts of the machine are supported by a pedestal, A, of cast-iron. This is cast hollow, with walls of sufficient thickness to give it the required solidity and strength, and has a tubular column extending to a convenient height, and a circular base of considerable area to give it steadiness upon the floor. A wing, $A^2$, cast on one side of the pedestal A, at its upper end, has a vertical bore, which receives a tubular slide, B, within which a spindle, C, is free to rotate. A horizontal sleeve-bearing, $A^3$, tangential to said vertical slide, supports a horizontal rock-shaft, D, having at its respective ends a hand-lever, D', and a pinion, D², the latter meshing with a rack, B', formed in the back of said slide, as seen in Fig. 1ᵇ. Provision is thus made for raising and lowering said spindle C without interfering with its rotation. An adjustable spline, a, with set-screws a' a' acting thereon, as seen in Figs. 1 and 1ᵃ, provides at once for preventing any rotation of the slide B and limiting its reciprocation, and also for tightening the slide so as to adapt the same with its load, and that of said spindle C, to remain in different positions to which they are moved. To counterbalance the weight of said hand-lever D' in its different positions, an adjustable weight, D³, is mounted on an arm projecting from the hub of the hand-lever D', as seen in Figs. 1 and 3, being provided with a set-screw, b', for fastening it. A collar, c, on the lower end of the spindle C, secures it within the slide B. The upper end of said spindle C is provided in a customary way with a circular-saw clamp, E E, and in addition thereto is provided above the clamp with an index worm-gear, F, and with a hand-wheel nut, G, above the latter, for tightening the saw-clamp upon the saw-plate and uniting said index-gear therewith, so that the saw may be rotated through the medium of said index-gear.

A steady-pin connecting the index-gear with the subjacent collar or part of the saw-clamp E E, may be used as an additional safeguard when large saws are to be filed; but the friction between the tightened parts is ample for ordinary work, and the omission of steady-pins greatly facilitates adjusting the saws preparatory to the filing operation.

The index-gear F has one tooth for every two teeth of the saw-pattern corresponding therewith, and is meshed by a worm, F', adapted to turn said index-gear the distance of one tooth for each revolution of the worm. This worm is carried by the inner end of a horizontal shaft, H, Fig. 4, which is mounted in a laterally-swinging support composed of a sleeve, I, inclosing the shaft, and having a vertical pivot I', integral therewith near its outer end. By turning said support on the axis of said pivot the worm may be swung clear of the index-gear and saw, as indicated by dotted lines in Fig. 4. Provision is thus made for introducing and removing the saw, and also for applying, if required, a larger or smaller index-gear suited to a different pattern of saw, a sufficient number of interchangeable index-gears forming part of the furniture of the machine. The worm is held in mesh with the index-gear by a set-screw, c', tapped into the side of the vertical socket that holds said pivot I', as seen in Figs. 1 and 2, which socket is formed at the outer end of a horizontal arm, B², projecting from the slide B at its upper end. A hand-wheel, H', applied to the outer end of said shaft H, provides for rotating the latter, and therethrough said worm F', and is constructed with a pair of notches, n n, in its periphery to engage with a spring-detent, d, in the form of a vertical pin having a double beveled upper end to engage with said notches and projected by a spiral spring beneath its lower end. (See Fig. 1.) This detent and its spring are accommodated within and supported by a projection cast on said vertical pivot I', so that its position with reference to said sleeve I, which supports said shaft H, is the same at all times; or, in other words, is not disturbed by swinging the worm F' out of mesh or by the use of index-gears of different diameters. Said detent d serves to check the rotation of the hand-wheel H sufficiently to facilitate stopping it at every half-turn, and the saw-plate or saw may thus be moved the distance of one tooth, and held steadily at this point while the tooth is being filed, and so on around until the filing is completed. Immediately above said wing A² the column of the pedestal A terminates in a horizontal flat wing, A⁴, forming its top, which is seen fully exposed in Fig. 3ᶜ. This top has a vertical longitudinal slot, s, extending in the form of a deep groove across the top of said column, which slot receives a screw, d', inserted from below upward into a nut, n², Figs. 3ᵃ, 3ᵇ, in a pivotal horizontal plate, K, said nut occupying a curved depression, d², in the top of said plate coinciding with a curved slot, s², through which said screw d' passes. A pivotal stud-pin, p, projects from one corner of said plate into said slot s of the pedestal-top A⁴, and coacts with said screw d' to prevent lateral displacement of the plate, while by means of said screw the plate is readily clamped upon the pedestal-top in different positions. A guide-rib, r, and a drilled and tapped lug, l, on the top of said plate, and a screw-hole, h, therein, as seen in Figs. 3ᵃ, 3ᵇ, provide for supporting and adjusting thereupon a superposed head frame or stock, L, of L shape in vertical cross-section. The upright portion of this frame is provided with bearings for a pair of horizontal spindles or arbors, M M², and these arbors carry at one end of the head the files N N², while at the other end of the head they are united by gearing M³, consisting of a pair of spur-wheels of equal diameter, and the upper arbor is elongated and provided with a grooved pulley, M', which receives a driving-band from a convenient line-shaft. The files N N² are thus rotated in opposite directions with uniform speed. A screw, e', passes downward through a slot, s³, in the horizontal portion of said head-frame L into said screw-hole h in the plate K, and a horizontal screw, f', passing through said lug l, parallel with said guide-rib r on said plate K, impinges a lug, l², on said horizontal portion of the head-frame L, and provides for moving the latter in line with said guide-rib, which is embraced by a groove in the sole of the head-frame, to vary the depth of cut, or, in other words, to adjust the files N N² for cutting more or less deeply into the saw-plate. The cutting-points of the respective files N N² are located in one and the same vertical line, and substantially in line with said pivotal stud-pin $p$, upon which the base-plate K swings when the curved slot $s^2$ therein is utilized for adjusting the files to vary the shape of cut which they will produce, or, in other words, to provide for producing saw-teeth of different shapes, or more or less "hooking," as required. It is absolutely necessary that the cutting-points of the file should be in line, as above stated, to render the respective sides of the filed saws alike. In order to bring them into line by adjustment, in case there should be any difference in original thickness or wear in the two files, or any imperfection in adjustment in any of the parts which would disarrange the files with reference to their alignment, as aforesaid, one of said arbors M M²—the lower arbor, M², in the example—is made adjustable. The means by which this is accomplished are best shown in Figs. 2, 2ª, and 4. The bearings on the face of the head-frame L, in which the arbors M M² are held, as aforesaid, are formed in part by caps O O², attached by screws, and provided with Babbitt-metal linings. Now, said lower arbor, M², is constructed with a circumferential groove, $g^2$, within its bearing, formed in part by said cap O, and the Babbitt-metal lining of said cap O, being cast around said arbor, is provided with a corresponding rib, $r^2$, Fig. 2ª, which rib, when the cap O is in place, occupies said groove $g^2$. A slot, $s^4$, in the cap O, to receive its attaching-screw $g'$, provides for adjusting the cap longitudinally with reference to the length of the arbors, and by so shifting it said lower arbor, M², and therewith the lower file, N², are adjusted with reference to the upper arbor and file, M N, as may be required to render the cutting-points of the two files absolutely in line with each other. To the back of said head-frame L a pair of stop-gages, P P², are attached by pivotal screws $h'\ h'$, Figs. 3, 4, and 5, which are received by screw-sockets formed in said upright portion of the head-frame. These stop-gages are constructed, as best seen in Figs. 2ᵇ and 5, with integral toothed segments $t\ t$, which intermesh with each other, and cause the two stop-gages to move in unison, while their said pivotal attaching-screws permit this movement, and provide for clamping them in different positions with the utmost facility and with all necessary solidity. The outer and effective ends of the respective stop-gages project above and below the saw-plate, as held in the saw-clamp E E, when the parts are in working position or in a working relation to each other, and limit the upward and downward movements of the saw-plate produced by rocking said hand-lever D', as illustrated by Fig. 5.

To provide for variations in the files, one of the stop-gages may be furnished with a correcting-screw, $i'$, Fig. 2ᵇ, perpendicular to its point, or be rendered independently adjustable in other known ways.

The rotary files N N² are of peculiar construction, and are preferably produced in a peculiar way, as illustrated by Figs. 4ª, 4ᵇ, 4ᶜ, and 4ᵈ on Sheet 4. Each file is in shape a conical annulus, closed at its smaller end, except as to a central hole to receive the arbor end which carries it; or, in other words, is of "dish-shape," with a single beveled periphery, and upon this periphery the file-teeth are located, while its salient front edge is adapted to produce the entering cut by which the file penetrates into the saw-plate in producing deeper teeth.

Desiring to make the file of iron and steel combined, so as to obtain the well-known advantages of tools so formed, and chiefly the protection of the file against warping in tempering, and, if possible, to accomplish this in an economical and satisfactory way by the use of iron and steel stock now in the market, I finally accomplished these objects, and at the same time produced a very light and rigid file of the pattern shown in the drawings.

My process is as follows: I first cut a circular disk of the iron and steel stock from a bar of suitable width and thickness, its width limiting the diameter of the disk, as seen in Fig. 4ª, and its thickness the thickness of the blank, as seen in Fig. 4ᵇ. Placing this disk between suitable dies in a drop-press, I reduce it to the shape represented by Figs. 4ᶜ and 4ᵈ, the former being a face view of the product, and Fig. 4ᵈ a section thereof. In this way the steel and iron are effectively distributed throughout the entire area of the file, while the steel forms the beveled periphery of the file, and is present at the front edge jointly with the iron backing in such a way as to facilitate preserving a sharp entering-edge. The files N N² are file-cut right and left, respectively. I do not limit myself to this mode of making rotary files for use in my machine.

The operation of the machine as a whole may be stated as follows: The hand-wheel nut G having been unscrewed from the upper end of the spindle C, and the index-gear F with the upper half of the saw-clamp E E removed from the spindle, a saw-plate or "saw," S, is adjusted upon the lower half of said saw-clamp, the upper half of the clamp with said index-gear is replaced, and said hand-wheel nut is applied and tightened so as to render all these parts frictionally united for rotation together. The worm F' is now swung from the position indicated by the dotted line $l^2$ in Fig. 4 into mesh with the index-gear F, and held in mesh by tightening the clamp-screw $c'$, and the spindle C is moved vertically, if necessary, by means of the hand-lever D' through the pinion D², rack B', and slide B, to bring the saw to its central or normal position, wherein it is sustained by the counter-weight D³, adjusted, if necessary, by means of the set-screw $b'$ and by the frictional device $a\ a'$. In this position of the saw S, represented in Figs. 1 and 2 and in full lines in Fig. 5, it is out of contact with both the files N N².

The files are now adjusted, if necessary, with reference to the diameter of the saw and the desired shape of saw-teeth, as indicated, respectively, by arrows $z$ and $y$, Fig. 4, by loosening the screw $d'$ from beneath the pedestal-top $A^4$ and shifting the base-plate K, and therewith the head-frame L, carrying the files and file-gear toward the saw, said movement being permitted by said slot $s$, Fig. $3^a$, and then adjusting the head-frame K, and therewith the files N $N^2$ after loosening said screw $e'$, and by the aid of said pivot $p$ and slots $s^2$, Figs. $3^b$, $3^a$, so that the files shall stand at the proper angle to produce such shape of teeth, as illustrated by full and dotted lines at the right in Fig. $4^x$, after which said screw $d'$ is retightened. The head-frame L, and therewith the files N $N^2$, may now be adjusted so as to obtain with all requisite nicety the exact depth of cut for the length of saw-teeth desired, as illustrated by full and dotted lines at the left in said Fig. $4^x$, and by arrows $x$ in Fig. 4. This adjustment, it will be seen, is in line with the faces of the files, so that it does not vary the shape of teeth produced by the latter, and is effected by sliding the head-frame L upon said guide-rib $r$ with the aid of the gage-screw $f'$. The clamp-screw $e'$ may now be tightened. If the respective files appear to be out of line with each other vertically to the least extent, said screw $g'$ is loosened, and the lower file, $N^2$, is adjusted, as aforesaid, by means of said slotted and internally-ribbed cap, O, and the grooved arbor $M^2$, as indicated by arrows $w$ in Fig. 4. The stop-gages P $P^2$ may next be adjusted by loosening their pivotal attaching-screws $h'$ $h'$, turning the gages the proper distance apart, as indicated by arrows $v$ $v$, Fig. 5, and fastening them by retightening said screws. This limits more or less the vertical movement of the saw S, and thus determines the degree of bevel or fleam given to the saw-teeth, or permits them to be filed with a square front if a "rip-saw" is being filed, as illustrated by Fig. $5^a$. Referring to this figure, it will be seen that if the movement of the saw be limited, as indicated by arrows 1 in this figure, so that its edge comes in contact with the files near the inner points of their circumferences, a flat bevel or fleam will be produced. If the movement of the saw be greater, as indicated by arrows 2, the bevel will be more obtuse or blunt; and if the movement be that represented by arrows 3, so that the saw reaches the midline of each file, the teeth will be filed square in front, as well as upon their backs. The back of each saw-tooth is square in all cases, as aforesaid, being formed by the entering-edges of the files, as seen Fig. $4^x$, the front edge of each file, which forms or supports said cutting-edge, being vertical and parallel with said vertical slide B, which carries said spindle C, and therewith the saw-clamp and saw. The operator now stands with his left hand on the handle of the hand-wheel H', and with his right hand grasps the upper end of the hand-lever D'. With the latter, through the medium of the said rock-shaft D, pinion $D^2$, and rack B', he elevates or lowers the vertical slide B, and therewith the saw-clamp E E and saw S, bringing the latter into contact with one of the files N $N^2$, say the lower file, $N^2$. The latter enters an interdental space of the saw-edge, and by means of its outer edge cuts into the saw-plate for the desired depth of tooth, and by its peripheral cutting-surface, forms the front of the succeeding tooth, with the desired fleam or square, as may be desired. This operation is properly limited by the stop-gage $P^2$. The hand-lever D' is now brought again into vertical position, and while it is held there the operator gives the hand-wheel H' a half-turn with the aid of its stop-notches $n$ $n$ and the spring-detent $d$, and, through the medium of the shaft H, worm F', index-gear F, and clamp E E, rotates the saw S, said spindle C turning freely therewith. The saw is thus moved the space of one tooth, and is now ready to be brought into contact with the other file, N, and is moved in this direction until its motion is arrested by the stop-gage P. Supposing that the hand-wheel H' is turned to the right, as indicated by the arrow thereon in Fig. 1, the saw S is turned in the direction of the arrow thereon in Fig. 4, and at the second operation above stated the back of another tooth is formed by means of the outer edge of said file N, while the periphery of the file shapes the front of that tooth, the back of which was formed at the preceding operation.

The hand-wheel may in practice be turned either way, as may be most convenient for the operator, and it is only necessary to turn the saw a complete revolution, giving it a rest each time the detent $d$ enters a stop-notch, $n$, and bringing the saw S into contact with the continuously-driven files N $N^2$ alternately at or during the respective rests of the saw, in order to furnish the saw with a complete set of mechanically-true teeth, of uniform depth and shape, with square backs, and with their bevel or fleam, if the saw be a cutting-off saw, confined to the front of each tooth, and reversed on alternate teeth, so as to render the saw perfectly balanced as to lateral strain, as shown in Fig. $5^b$.

Modifications are proposed as follows: The hand-wheel H' may have any preferred number of stop-notches $n$, or indents of other forms, the index-gears F and detent $d$ being correspondingly modified, and known equivalents of other parts and details may be used.

Having thus described my said machine for filing circular saws, I claim as my invention—

1. The combination, in a saw-filing machine, of a vertical spindle furnished with a saw-clamp, devices by means of which the operator may raise and lower said spindle, and rotary files having horizontal axes and located with reference to the path of the saw-plate as carried by said spindle, substantially as herein specified.

2. The combination, in a saw-filing machine, of a vertical spindle furnished with a saw-clamp, devices by means of which the operator may raise and lower said spindle, a pair of rotary files having horizontal axes and arranged one above the other, and a device, substantially as described, for supporting the saw-plate by means of said spindle between and out of contact with the files.

3. The combination, in a saw-filing machine, of a vertical spindle furnished with a clamp for circular-saw plates, and with an index-gear, a horizontal shaft carrying at its inner end a worm meshing with said index-gear, and furnished at its outer end with a hand-wheel having stop-notches in its periphery, and a spring-detent coacting with said notches, substantially as herein described, for supporting and intermittently rotating the saw-plate in the manner set forth.

4. The combination, in a saw-filing machine, of a pair of rotary files having beveled cutting-peripheries and carried by parallel arbors, means for moving a circular-saw plate sidewise into contact with the respective files alternately, and means for turning the saw-plate in its plane of rotation between its successive contacts with the files, substantially as herein described, for filing the teeth of circular saws fleaming, with the fleam confined to the fronts of the teeth, and formed on opposite sides of alternate teeth, as set forth.

5. The combination, in a saw-filing machine, of a pair of rotary files having beveled cutting-peripheries, and carried by parallel arbors driven in opposite directions, means for moving a circular-saw plate sidewise into contact with the respective files alternately, and means for turning the saw-plate in its plane of rotation between its successive contacts with the files, substantially as herein described, for filing the teeth of circular saws fleaming, without "stubbing," in the manner set forth.

6. In a saw-filing machine, the combination, substantially as herein specified, of a vertical spindle carrying the saw-clamp, devices by means of which the operator may raise and lower said spindle, a pair of rotary files carried by horizontal arbors above and below the normal plane of the saw-plate, and stop-gages which limit the movements of the saw-plate away from said normal plane for determining the angle of the front of each saw-tooth in the manner set forth.

7. In a saw-filing machine, a pair of pivoted stop-gages having clamp-screws as their pivots, and constructed with intermeshing spur-teeth concentric with said pivots, substantially as herein described, for the purpose set forth.

8. The combination, in a saw-filing machine, of the horizontal pedestal-top $A^4$, having a longitudinal slot, and a horizontal plate, K, supported thereon, and adjustable by means of a vertical pivot, and a clamping-screw occupying said slot, substantially as herein specified.

9. The combination, in a saw-filing machine, of the horizontal pedestal-top $A^4$, having a longitudinal slot, a horizontal plate, K, supported thereon, and adjustable by means of a vertical pivot, and a clamping-screw occupying said slot, with a slot in said plate concentric with said pivot, and a sliding nut within a depression in its upper surface to receive said clamping-screw, substantially as herein specified.

10. The combination, in a saw-filing machine, of the horizontal pedestal-top $A^4$, having the slot $s$, the horizontal plate K, having the pivotal stud-pin $p$ on its lower surface occupying said slot, the slot $s^2$, concentric with said pivot, the depression $d^2$ and screw-hole $h$ in its upper surface, and the rib $r$ and lug $l$ upon the same, the head-frame L, having a grooved sole fitted to said plate K, and provided with the lug $l^2$ and slot $s^3$, the sliding-nut $n^2$, occupying said depression $d^2$, and the clamping-screws $d'$ $e'$, and gage-screw $f'$, substantially as shown, for the purpose set forth.

11. The combination, in a saw-filing machine, of a pair of rotary files carried by horizontal arbors and arranged one above the other, and means for adjusting one of said arbors longitudinally to render the cutting points of the respective files in absolute line with each other in a vertical plane, substantially as herein specified.

WILLIAM TUCKER.

Witnesses:
 HENRY M. TOWER,
 LEONARD W. BEMIS.